United States Patent
Fukaya

(10) Patent No.: US 11,947,291 B2
(45) Date of Patent: Apr. 2, 2024

(54) IMAGE FORMING APPARATUS, IMAGE FORMING METHOD, AND PROGRAM

(71) Applicant: TOSHIBA TEC KABUSHIKI KAISHA, Tokyo (JP)

(72) Inventor: Hideaki Fukaya, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/898,452

(22) Filed: Aug. 29, 2022

(65) Prior Publication Data
US 2024/0069474 A1    Feb. 29, 2024

(51) Int. Cl.
    *G03G 15/20*      (2006.01)
    *G06F 3/12*      (2006.01)

(52) U.S. Cl.
    CPC ......... *G03G 15/205* (2013.01); *G06F 3/1292* (2013.01)

(58) Field of Classification Search
None
See application file for complete search history.

(56) References Cited

U.S. PATENT DOCUMENTS

| | | | | |
|---|---|---|---|---|
| 2006/0251431 A1* | 11/2006 | Lee | ..................... | G03G 15/55 399/16 |
| 2020/0257229 A1* | 8/2020 | Sato | ................... | G03G 15/2032 |
| 2020/0379383 A1* | 12/2020 | Akamatsu | .......... | G03G 15/2039 |
| 2022/0043378 A1* | 2/2022 | Murata | .............. | G03G 15/2039 |

FOREIGN PATENT DOCUMENTS

| | | | | |
|---|---|---|---|---|
| JP | 2006350200 A | * | 12/2006 | |
| JP | 2010243710 A | * | 10/2010 | |
| JP | 2017-009900 A | | 1/2017 | |
| JP | 2017009900 A | * | 1/2017 | |
| JP | 2021124647 A | * | 8/2021 | ......... G03G 15/2003 |

OTHER PUBLICATIONS

Machine translation of Igasaki Akihiko, JP 2017-009900 (2017).*

* cited by examiner

Primary Examiner — Sevan A Aydin
(74) Attorney, Agent, or Firm — Kim & Stewart LLP

(57) ABSTRACT

An image forming apparatus includes a wireless tag communication device configured to communicate with a wireless tag attached to a sheet, a fixing device configured to fix a toner image on the sheet, and a processor configured to: upon receipt of a print job, control the communication device to read from the wireless tag a first fixing temperature that has previously been used to fix a toner image on the sheet, determine a second fixing temperature to be used by the fixing device based on the first fixing temperature, and execute the print job by controlling the fixing device to fix a toner image on the sheet at the second fixing temperature.

14 Claims, 6 Drawing Sheets

| ADDRESS | PRINTED | FIXING TEMPERATURE | PRINTING DATE AND TIME | TONER TYPE | | |
|---|---|---|---|---|---|---|
| | | | | MANUFACTURER | PRODUCT NUMBER | LOT |
| 1 | 1 | 150°C | 2022/2/22 | XX COMPANY | 1234 | aa54321 |
| 2 | Null | Null | Null | Null | Null | Null |

IMAGE FORMING APPARATUS, IMAGE FORMING METHOD, AND PROGRAM

FIELD

Embodiments described herein relate generally to an image forming apparatus, an image forming method, and a non-transitory computer readable medium.

BACKGROUND

An image forming apparatus such as a printer or a multifunction peripheral (MFP) that uses toner has been used. Such an image forming apparatus includes a fixing device that fixes the toner on a sheet. The fixing device heats and melts the toner on the sheet at a predetermined fixing temperature to thereby fix the toner to the sheet.

Various sheets can be used in an image forming apparatus. As an example, a sheet including a wireless tag embedded therein or affixed thereon is sometimes used. Various kinds of information can be written into such wireless tags. The information is generally written into the wireless tag while the sheet is being conveyed along on a conveyance path within the image forming apparatus as part of a printing of the sheet.

From the viewpoint of recycling of sheets or limiting total sheet usage, printing may be performed on a rear (backside) surface of a sheet (referred to as rear surface printing or backside printing) with the front surface (frontside) of the sheet having already been printed. The rear surface printing can also performed on a sheet including a wireless tag for recycling of sheets.

However, in the related art, if a fixing temperature in the rear surface printing is higher than a fixing temperature used in the front surface printing, toner printed on the front surface of a sheet sometimes melts during the fixing of the rear surface printing. Consequently, the sheet may be stained or marred and components of the fixing device can be smeared with the melted toner. In some case, the fixing device is broken or damaged by such occurrences. Accordingly, in the related art, rear surface printing sometimes cannot be appropriately performed.

DETAILED DESCRIPTION

Figure 1:
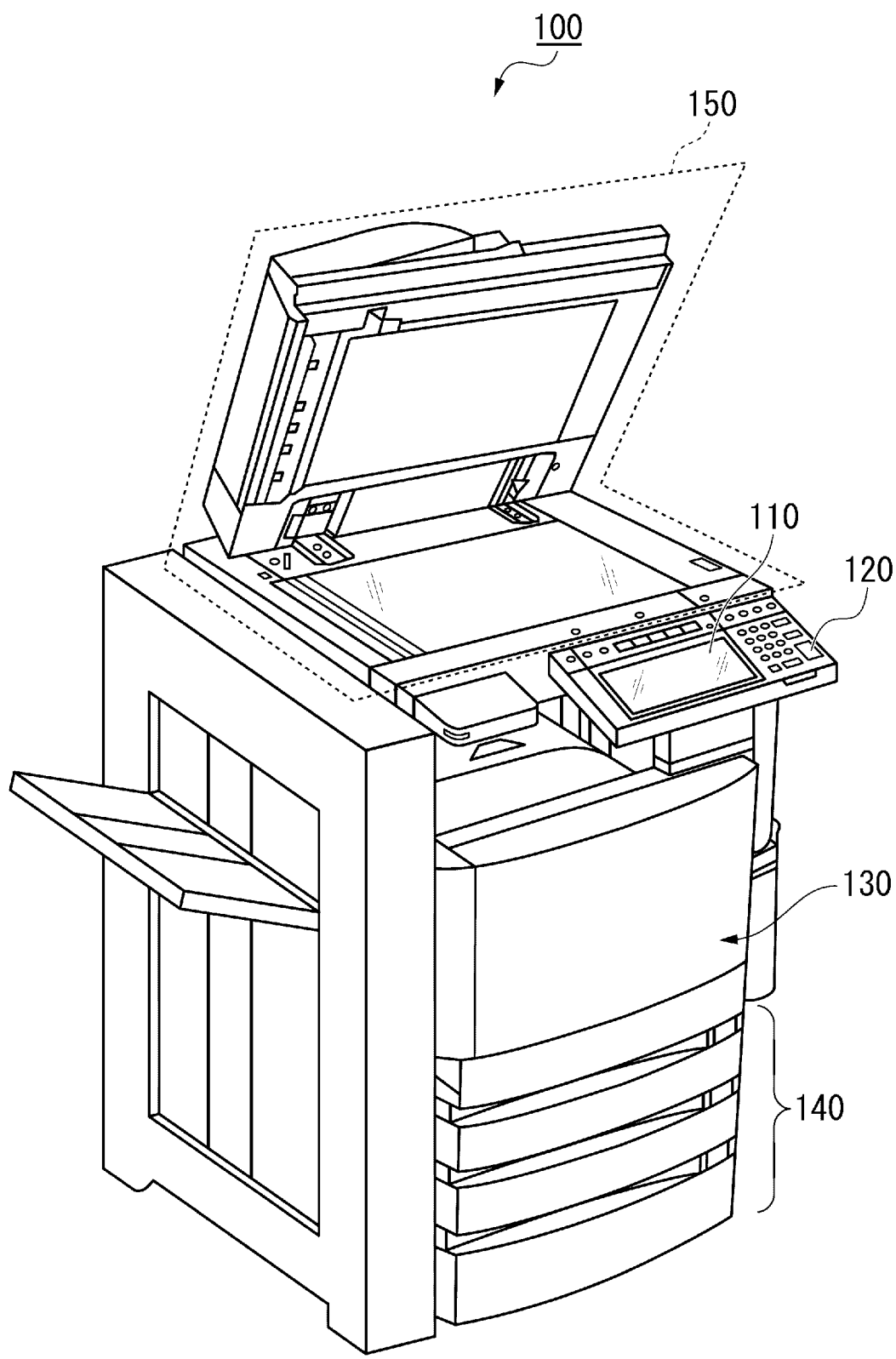
FIG. 1 is an exterior view of an image forming apparatus in an embodiment.

An image forming apparatus in one embodiment includes a wireless tag communication device configured to communicate with a wireless tag attached to a sheet, a fixing device configured to fix a toner image on the sheet, and a processor. The processor is configured to, upon receipt of a print job, control the communication device to read from the wireless tag a first fixing temperature that has previously been used to fix a toner image on the sheet, determine a second fixing temperature to be used by the fixing device based on the first fixing temperature, and execute the print job by controlling the fixing device to fix a toner image on the sheet at the second fixing temperature.

Image forming apparatuses and programs in certain example embodiments are explained below with reference to the drawings. In the following explanation, components having the same or similar functions are denoted by the same reference numerals and signs. Redundant explanation of the components is sometimes omitted.

First, an overall configuration of an image forming apparatus 100 is explained with reference to FIG. 1.

FIG. 1 is an exterior view of the image forming apparatus 100 in an embodiment. The image forming apparatus 100 is, for example, an MFP. The image forming apparatus 100 includes a display 110, a control panel 120, a printer 130, a sheet storing unit 140, and an image reading unit 150.

The display 110 is, for example, a touch panel-type liquid crystal display. The display 110 displays various kinds of information. The display 110 receives operation from a user.

The control panel 120 includes various operation keys such as numeric keypad and a start key. The control panel 120 receives various kinds of input operations from the user. The control panel 120 outputs operation signals corresponding to such input operations received from the user.

The printer 130 performs a series of printing operations using various kinds of information output from the display 110, the control panel 120, the image reading unit 150, and the like. The series of printing operations include an operation for inputting image information, an operation for forming an image, an operation for transferring the formed image to a sheet, and an operation for conveying the sheet.

The sheet storing unit 140 includes a plurality of sheet cassettes. The sheet cassettes can store different types of sheets. The types of the sheets include sheet sizes and sheet types. For example, the sheet sizes are an A5 size, an A4 size, an A3 size, and the like. The sheet types are normal copy paper and a sheet including a wireless tag. The wireless tag is, for example, an RFID (Radio Frequency Identifier) tag. Besides, the sheet types include a photograph sheet, a label sheet, and a polyester film sheet.

In this disclosure, it is assumed that the sheet cassettes include a sheet cassette in which the normal copy paper is stored and a sheet cassette in which a sheet including a wireless tag is stored. The image forming apparatus 100 stores, in association with each other, the sheet cassettes and the types of the sheets stored in the sheet cassettes. This association can be set by operation of an operator such as the user or an inspection staff member. If acquiring information indicating a type of a sheet to be printed, the image forming apparatus 100 can specify the type of the sheet based on the information and specify a sheet cassette in which the specified sheet is stored.

The image reading unit 150 includes an automatic document feeding device (ADF) and a scanner device. The automatic document feeding device feeds a document placed on a document tray to the scanner device. The scanner device optically scans a document on a document glass table and focuses reflected light from the document on a light receiving surface of a CCD (Charge Coupled Device) sensor. Consequently, the scanner device reads the document image on the document glass table. The image reading unit 150 generates image information or image data using a reading result of the reading by the scanner device.

Figure 2:
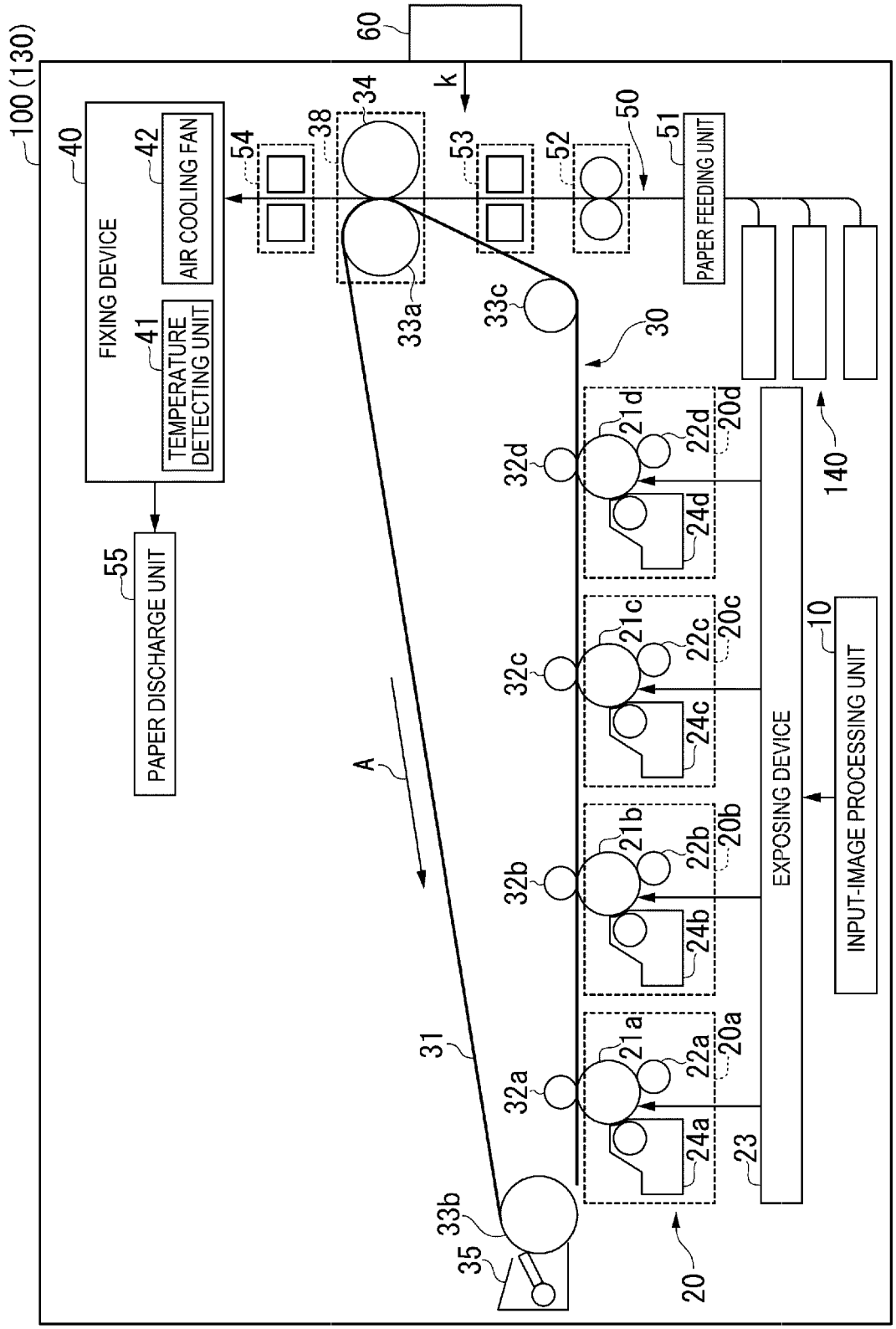
FIG. 2 depicts an internal configuration of an image forming apparatus.

FIG. 2 depicts an internal configuration of the image forming apparatus 100. As illustrated in FIG. 2, the image forming apparatus 100 or the printer 130 includes four image forming units 20a to 20d arranged in a line. The image forming apparatus 100 is a so-called quadruple tandem-type image forming apparatus. The image forming apparatus 100 includes an input-image processing unit 10, an image forming unit 20 (20a to 20d), an intermediate transfer unit 30, a fixing device 40, a sheet conveying unit 50, and a wireless tag communication device 60.

The input-image processing unit 10 is a processor or a processing circuit that inputs image information. The input image information is generated by the image reading unit 150 or transmitted from another device such as a personal computer. The input-image processing unit 10 performs digital image processing for processing the input image information according to initial setting or setting by the user. For example, the digital image processing includes gradation correction based on gradation correction data. Besides the gradation correction, the digital image processing includes, for image data, processing of various kinds of correction such as color correction and shading correction and processing such as compression.

Subsequently, the image forming unit 20 is explained. The image forming unit 20 includes the image forming unit corresponding to Y (yellow), the image forming unit 20b corresponding to M (magenta), the image forming unit 20c corresponding to C (cyan), and the image forming unit 20d corresponding to K (black). The image forming units 20a to respectively include photoconductive drums 21a to 21d, charging devices 22a to 22d, an exposing device 23, developing devices 24a to 24d, toner cartridges 25a to 25d, and not-illustrated drum cleaning devices. In the following explanation, the suffixes "a" to "d" are omitted since the description is common to each image forming unit 20a to 20d.

Each photoconductive drum 21 is, for example, a charging-type organic photo-conductor (OPC) formed by sequentially stacking an undercoat layer, a charge generating layer, and a charge transport layer on the circumferential surface of a conductive cylinder body made of aluminum. The photoconductive drum 21 has photoconductivity.

Each charging device 22 generates corona discharge. The charging device 22 uniformly charges the surface of the corresponding photoconductive drum 21.

The exposing device 23 is, for example, a semiconductor laser. The exposing device 23 irradiates each photoconductive drum 21 with a laser light corresponding to a different color component. If each laser light is emitted by the exposing device 23, the potential of a region of the surface of the corresponding photoconductive drum 21 irradiated with the laser light changes, thereby forming an electrostatic latent image on the surface of the photoconductive drum 21.

Each developing device 24 stores a developer. The developing device 24 causes toner of the corresponding color component to adhere to the surface of the photoconductive drum 21. Consequently, a toner image is formed on the photoconductive drum 21. That is, the electrostatic latent image formed on the surface of the photoconductive drum 21 is visualized.

The developer is explained. For example, a two-component developer is used as the developer. The two-component developer includes nonmagnetic toner and a carrier. As the carrier, for example, iron powder or polymer ferrite particles having a particle diameter of several ten micrometers are used. The carrier is mixed with the toner in the developing device 24 and frictionally charged to thereby charge the toner with electric charges (for example negative polarity charges). The carrier carries the toner to the electrostatic latent image with a magnetic force.

Each not-illustrated drum cleaning device includes a cleaning blade that is in contact with the surface of the corresponding photoconductive drum 21. The cleaning blade removes residual toner remaining on the surface of the photoconductive drum 21 after primary transfer. The removed residual toner is collected in a storing section included in the drum cleaning device.

Subsequently, the intermediate transfer unit 30 is explained. The intermediate transfer unit 30 includes an intermediate transfer body 31, a primary transfer roller 32, a plurality of supporting rollers 33, a secondary transfer roller 34, and a belt cleaning device 35.

The intermediate transfer body 31 is, for example, an endless transfer belt. The intermediate transfer body 31 is a belt not having electric conductivity and elasticity. Specifically, for example, the intermediate transfer body 31 is a belt made of polyimide. However, the intermediate transfer body 31 may have electric conductivity and elasticity.

Supporting rollers 33a to 33c support the intermediate transfer body 31 such that tension is applied to the intermediate transfer body 31. Consequently, the intermediate transfer body 31 is formed in a loop shape. Any one roller (for example, the supporting roller 33a) among the plurality of supporting rollers 33a to 33c is a driving roller. The rollers other than the driving rollers are driven rollers. The driving roller is driven to rotate, whereby the intermediate transfer body 31 travels in an A direction in FIG. 2 in a predetermined cycle at predetermined speed.

The direction in which the intermediate transfer body 31 moves can be defined as an upstream direction and a downstream direction. Specifically, the direction in which the intermediate transfer body 31 moves can be defined with the image forming unit 20a set on the most upstream side and the belt cleaning device 35 set on the most downstream side.

Each primary transfer roller 32 is disposed to be opposed to the corresponding photoconductive drum 21 via the intermediate transfer body 31. Specifically, the primary transfer roller 32 is disposed to apply pressure to the photoconductive drum 21 across the intermediate transfer body 31. Consequently, a primary transfer portion that nips the intermediate transfer body 31 is formed by the primary transfer roller 32 and the photoconductive drum 21.

If the intermediate transfer body 31 passes through the primary transfer portion, the toner image formed on the photoconductive drum 21 is transferred onto the intermediate transfer body 31. If the intermediate transfer body 31 passes through the primary transfer portion, a primary transfer bias is applied to the primary transfer roller 32. Specifically, for example, the primary transfer roller 32 is charged with electric charges having polarity (e.g., positive polarity) opposite to the polarity of the toner. Consequently, the toner image formed on the photoconductive drum 21 is electrostatically transferred onto the intermediate transfer body 31.

The secondary transfer roller 34 is disposed to be opposed to the supporting roller 33a via the intermediate transfer body 31. Specifically, the secondary transfer roller 34 is disposed to apply pressure to the supporting roller 33a across the intermediate transfer body 31. Consequently, a secondary transfer unit 38 that nips the intermediate transfer body 31 and a sheet is formed by the secondary transfer roller 34 and the supporting roller 33a.

If the sheet passes through the secondary transfer unit 38, the toner image formed on the intermediate transfer body 31 is transferred onto the sheet. If the sheet passes through the secondary transfer unit 38, a secondary transfer bias is applied to the supporting roller 33a. Specifically, the supporting roller 33a is charged with electric charges having the same polarity (e.g., negative polarity) as the polarity of the toner. Consequently, the toner image on the intermediate transfer body 31 is electrostatically transferred onto the sheet.

The secondary transfer roller 34 and the supporting roller 33a are separable. Consequently, if the secondary transfer unit 38 is jammed with a sheet, the user can remove the sheet.

The belt cleaning device 35 includes a cleaning blade that is in contact with the surface of the intermediate transfer body 31. The cleaning blade removes residual toner remaining on the surface of the intermediate transfer body 31 after secondary transfer. The removed residual toner is collected in a storing section included in the belt cleaning device 35.

The fixing device 40 heats and pressurizes the sheet onto which the toner image is transferred. The fixing device 40 includes, for example, an endless heating belt that heats the sheet and a pressurizing roller that is in press contact with the heating belt. A heating heater is provided inside the heating belt. The heating belt is heated and a nip region is formed between the heating belt and the pressurizing roller, whereby, if the sheet passes through the nip region, the toner on the sheet melts and adheres to the sheet.

The fixing device 40 includes a temperature detecting unit 41 and an air cooling fan 42. The temperature detecting unit 41 is, for example, a thermistor and detects the temperature of the fixing device 40. The temperature detecting unit 41 is not necessarily detect the temperature of the fixing device 40 directly, and may detect a command value indicating a fixing temperature issued for controlling the fixing device 40. The air cooling fan 42 blows air into the inside of the fixing device 40 to cool the fixing device 40.

Subsequently, the sheet conveying unit 50 is explained. The sheet conveying unit 50 includes a paper feeding unit 51, a registration unit 52, a first guide unit 53, a second guide unit 54, and a paper discharge unit 55. A sheet is conveyed from the paper feeding unit 51 toward the paper discharge unit 55. In the following explanation, about a sheet conveying direction, the paper feeding unit 51 side is sometimes referred to as "upstream side" and the paper discharge unit 55 side is sometimes referred to as "downstream side".

The paper feeding unit 51 conveys sheets stored in the sheet storing unit 140 to the registration unit 52 one by one. The registration unit 52 stops the sheet conveyed from the paper feeding unit 51 and feeds the sheet toward the secondary transfer unit 38 at predetermined timing. The predetermined timing is timing when the toner image formed on the intermediate transfer body 31 is secondarily transferred by the secondary transfer unit 38. The first guide unit 53 restricts a conveying direction of the sheet fed from the registration unit 52 to the secondary transfer unit 38.

The secondary transfer unit 38 transfers a toner image onto the sheet, the conveying direction of which is restricted by the first guide unit 53. Further, the secondary transfer unit 38 feeds the sheet, onto which the toner image is transferred, toward the fixing device 40.

The secondary guide unit 54 restricts a conveying direction of the sheet fed from the secondary transfer unit 38 to the fixing device 40. The fixing device 40 heats and pressurizes the sheet, the conveying direction of which is restricted by the second guide unit 54, and feeds the sheet to the paper discharge unit 55. The paper discharge unit feeds the sheet to a discharge tray.

The wireless tag communication device 60 includes a communication control circuit and an antenna not illustrated in FIG. 2. In one embodiment, a wireless tag is an RFID tag. For example, the wireless tag communication device 60 transmits a radio wave in an arrow k direction in FIG. 2. The wireless tag communication device 60 communicates with a wireless tag provided in a sheet via the antenna. Specifically, the wireless tag communication device 60 has a read function for reading information written in the wireless tag and a write function for writing information into the wireless tag.

A communication range of the wireless tag communication device 60 is a range in which the wireless tag communication device 60 can read a wireless tag Tg of a sheet St passing on the sheet conveying unit 50 and cannot read a wireless tag Tg of another sheet St in the sheet storing unit 140. This is because, if the wireless tag communication device 60 can read the wireless tag Tg of the sheet St in the sheet storing unit 140, the wireless tag communication device 60 may read information from a plurality of wireless tags Tg and fail to read the wireless tag Tg of the target sheet St.

In the example of FIG. 2, one wireless tag communication device 60 is provided in the image forming apparatus 100. However, a plurality of (for example, two) wireless tag communication devices 60 may be provided in the image forming apparatus 100. Specifically, one of the two wireless tag communication devices 60 is provided read information from a wireless tag Tg, and the other is provided to write information into a wireless tag Tg. The wireless tag communication device 60 that writes information into a wireless tag Tg may not have the read function. The wireless tag communication device 60 that reads information from a wireless tag Tg may not have the write function.

The wireless tag communication device 60 that writes information into a wireless tag Tg may be disposed further on the downstream side in the sheet conveying direction than the wireless tag communication device 60 that reads information from a wireless tag Tg. For example, the wireless tag communication device 60 that writes information into a wireless tag Tg may be disposed near the fixing device 40. Consequently, even if a deficiency such as radio wave interference occurs and a radio wave is amplified, it is possible to make it difficult for the wireless tag communication device 60 to write information into other wireless tags Tg in the sheet storing unit 140.

Information written into a wireless tag includes, for example, in a case in which a sheet is used for physical distribution of goods or the like, information indicating an item, information indicating a destination, and information indicating what is printed on the sheet. As explained below with reference to FIG. 4, in one embodiment, the information written into a wireless tag Tg includes information concerning a fixing temperature at a first printing time in addition to or instead of the information described above.

In the wireless tag communication device 60, for example, a radio wave system in a 900 MHz band (UHF) is used. However, a frequency band is not limited to this. Other frequency bands can also be adopted. A system of a wireless tag is not limited to the RFID system. Other systems can also be adopted.

Subsequently, an example of a hardware configuration of the image forming apparatus 100 is explained with reference to FIG. 3.

Figures 3, 4:
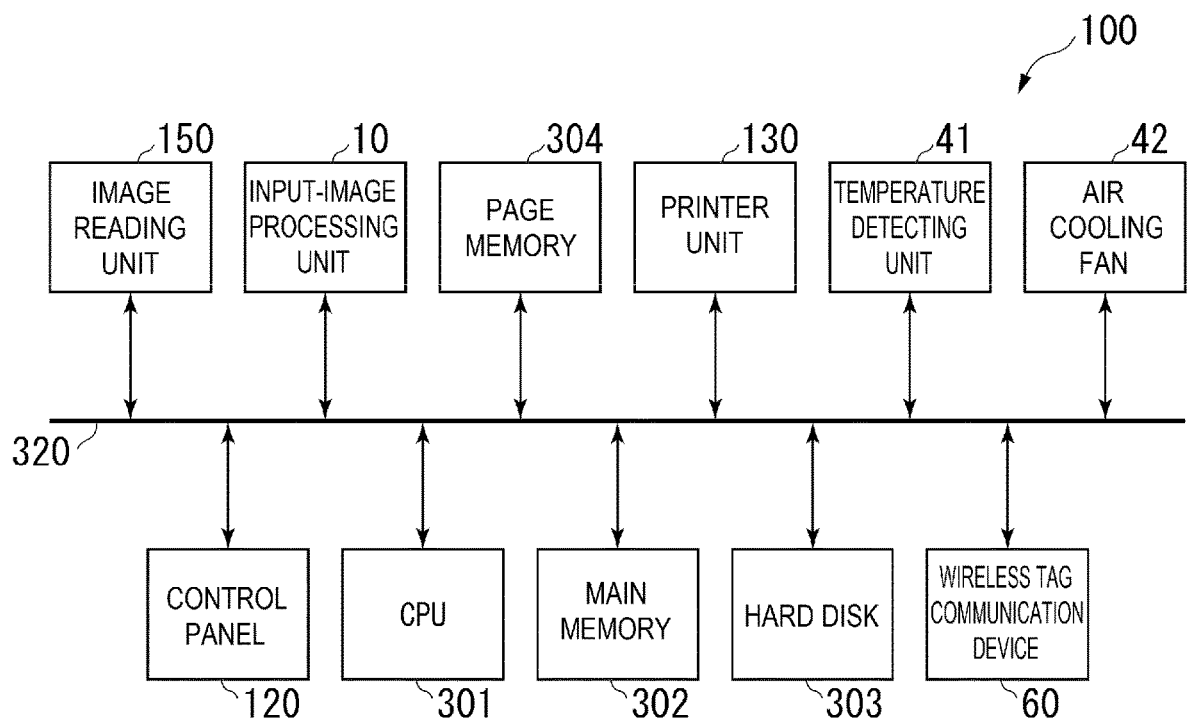
FIG. 3 is a hardware diagram of an image forming apparatus.
FIG. 4 depicts an example of information written in a wireless tag.

FIG. 3 is a hardware diagram illustrating an example of the hardware configuration of the image forming apparatus 100. In FIG. 3, the image forming apparatus 100 includes a CPU (Central Processing Unit) 301, a main memory 302, a hard disk 303, and a page memory 304 in addition to the components explained above. Those units are connected via a bus 320.

The CPU 301 reads out and executes various programs stored in the main memory 302 to thereby control the units illustrated in FIG. 3. The various programs include a fixing temperature control program described later.

The main memory 302 includes a ROM (read only memory), a RAM (random access memory), and the like. The ROM stores various kinds of information to be used by the CPU 301 such as programs. The RAM stores various kinds of information. For example, the RAM stores information acquired from an external device, information input by the user, and information generated in various kinds of processing.

The hard disk 303 is an HDD (hard disk drive) that stores various kinds of information. The hard disk 303 stores data according to control of the CPU 301.

The page memory 304 stores, with the input-image processing unit 10, a printing job for, for example, image data subjected to digital image processing. The page memory 304 outputs the stored image data to the printer 130. Consequently, the printer 130 forms an image based on the image data stored in the page memory 304.

Subsequently, information written into a wireless tag Tg of a certain sheet is explained with reference to FIG. 4.

FIG. 4 depicts an example of information 400 written in a wireless tag Tg. As illustrated in FIG. 4, the information 400 includes items of "address", "printed", "fixing temperature", "printing date and time", and "toner type".

The "address" indicates a region where data is written. For example, information is written in an address "1" in first surface printing (hereinafter simply referred to as "first printing") and information is written in an address "2" in second surface printing (hereinafter simply referred to as "second printing"). The "printed" indicates indicating that the printing is performed or "Null" indicating that the printing is not performed. The "fixing temperature" indicates the temperature of the fixing device when the printing is performed. The temperature is can be detected by the temperature detecting unit 41. The "printing date and time" indicates a date when the printing is performed. In FIG. 4, the "printing date and time" indicates a date. However, the "printing date and time" may be more detailed information including hour, minute, and second.

The "toner type" includes "manufacturer", "product number", and "lot". The "manufacturer" indicates a manufacturer of toner used when the printing is performed. The "product number" indicates identification information of the toner used when the printing is performed. The "lot" indicates a manufacturing lot of the toner used when the printing is performed.

The information 400 shown in FIG. 4 indicates that the first printing was performed on Feb. 22, 2022, and the fixing temperature at that time was 150° C. The information 400 includes information of the toner type used at that time. Here, all the items of the information 400 are "Null" because no image has been printed on the rear surface (the second printing has not been performed).

Subsequently, a functional configuration of the image forming apparatus 100 is explained with reference to FIG. 5.

Figure 5:
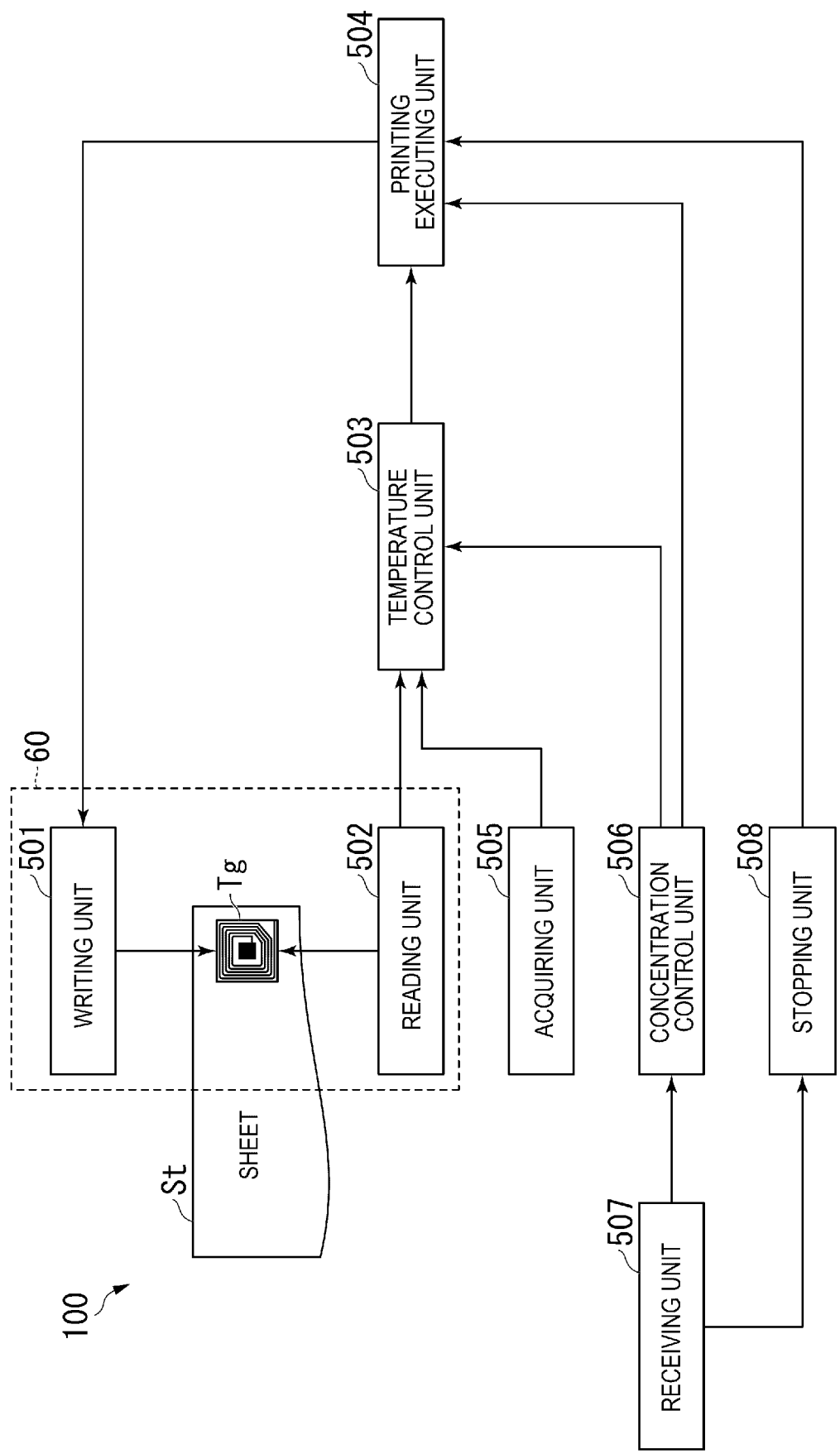
FIG. 5 is a functional block diagram of an image forming apparatus.

FIG. 5 is a functional diagram of the image forming apparatus 100. In FIG. 5, the image forming apparatus 100 performs the functions of a writing unit 501, a reading unit 502, a temperature control unit 503, a printing executing unit 504, an acquiring unit 505, a concentration control unit 506, a receiving unit 507, and a stopping unit 508. The units are performed by the CPU 301 according to a detection program stored in the main memory 302 or the hard disk 303.

The functions of the units shown in FIG. 5 may be performed using hardware (including circuitry) such as an LSI (Large Scale Integration), an ASIC (Application Specific Integrated Circuit), an FPGA (Field-Programmable Gate Array), or a GPU (Graphics Processing Unit) or by cooperation of software and hardware.

First, writing of information into a wireless tag Tg is explained. In the first printing (the front surface printing) on a sheet St including a wireless tag Tg, the writing unit 501 writes, into the wireless tag Tg, a fixing temperature of fixing toner on the sheet St. The front surface printing is single-sided printing performed for the first time on an unused sheet St. In this specification, a second printing (the rear surface printing) means performing printing on the rear surface by reusing the sheet St on which a first printing or a front surface printing has already been performed. The first and second printings need not occur in one double-sided printing process in which front and back of the sheet are printed as part of the same print job, multipage document, or the like. The first and second printings may occur in single-sided printing processes separated in time and/or related to different print jobs or documents. The second printing is generally a reuse (recycling) of a previously single-side printed sheet.

If the front surface printing is executed, the writing unit 501 writes, into the wireless tag Tg, history information indicating that the front surface printing was executed. Specifically, if the front surface printing is executed, the writing unit 501 writes, for example, the information 400 illustrated in FIG. 4 into the wireless tag Tg. If the rear surface printing is executed, the writing unit 501 writes, into the wireless tag Tg, history information indicating that the rear surface printing was executed. The history information indicating that the front surface printing was executed and the history information indicating that the rear surface printing was executed are information indicating the number of times of printing that has been performed on the sheet St.

The writing unit 501 writes toner information indicating a toner type into the wireless tag Tg. For example, the toner information is input by an inspection staff member or the like at a toner replacement time or a maintenance time and stored in the hard disk 303. The writing unit 501 acquires the toner information stored in the hard disk 303 and writes the toner information into the wireless tag Tg. The toner information may not be input and stored in the hard disk 303. In such a case, the toner information is not written in the wireless tag Tg. That is, the items of the toner type of the information 400 illustrated in FIG. 4 are "Null".

Subsequently, reading of information of the wireless tag Tg is explained. In the rear surface printing of the sheet St, the reading unit 502 reads the surface fixing temperature and the history information written in the wireless tag Tg. The reading unit 502 reads the wireless tag Tg of the sheet St on the sheet conveying unit 50.

Subsequently, temperature control for the fixing device 40 in the rear surface printing is explained. The temperature control unit 503 controls the temperature of the fixing device 40 in the rear surface printing to temperature based on the surface fixing temperature. The control temperature based on the surface fixing temperature is specifically temperature equal to or lower than the surface fixing temperature. Setting of the control temperature based on the surface fixing temperature may be changeable in a manufacturing stage, at an inspection time, and the like. For example, the control temperature may be set based on the surface fixing temperature. If the set temperature is 0° C., the control temperature is set to the same temperature as the surface fixing temperature. If the set temperature is −5° C., the control temperature is set to temperature lower than the surface fixing temperature by 5° C. The control temperature only has to be a degree of temperature at which melting of the toner on the surface is not expected and may be set to, for example, temperature higher than the surface fixing temperature. For example, the control temperature may be settable to temperature higher than the surface fixing temperature by 2° C.

If the number of times of printing indicated by the history information is one, the temperature control unit 503 controls the temperature of the fixing device 40 to the temperature based on the surface fixing temperature. The number of times of printing being indicated as one specifically means that the front surface printing (the first printing) has been executed but the rear surface printing (the second printing) has not been executed.

The printing executing unit 504 executes printing at the fixing temperature controlled by the temperature control unit 503.

A melting temperature of toner is sometimes different for each manufacturer or each brand. Accordingly, the fixing temperature in the rear surface printing may be set to temperature considering a melting temperature of toner used in the front surface printing. Specifically, the temperature control unit 503 may control the temperature of the fixing device 40 in the rear surface printing to temperature based on a toner type used in the front surface printing in addition to the surface fixing temperature.

For example, toner fixed on a sheet may melt at 165° C. even if the surface fixing temperature of the toner is 170°. In such a case, the temperature control unit 503 controls the fixing temperature in the rear surface printing to 165° C.

The temperature control unit 503 refers to correspondence data representing toner types in association with melting temperatures, acquires the melting temperature corresponding to a toner type read from the wireless tag Tg, and controls the fixing temperature in the rear surface printing. The correspondence data may be stored in the hard disk 303 or may be stored in an external device.

Subsequently, a case in which printing is performed at a target fixing temperature in the rear surface printing is explained. The acquiring unit 505 acquires a target fixing temperature that is set when the rear surface printing is performed on a sheet St. The target fixing temperature is set at a printing start time based on a printing job stored in the page memory 304. More specifically, the target fixing temperature is temperature set according to a printing rate of characters and/or images printed on the sheet St (e.g., a ratio of a total area of toner to be formed on a sheet to the entire area of the sheet), a type of the sheet St, an environmental temperature, and the like.

The temperature control unit 503 compares the target fixing temperature acquired by the acquiring unit 505 and the surface fixing temperature read from the wireless tag Tg. If the target fixing temperature is equal to or lower than the surface fixing temperature, the temperature control unit 503 controls the temperature of the fixing device 40 to the target fixing temperature. That is, the printing executing unit 504 performs the rear surface printing while keeping the target fixing temperature.

On the other hand, if the target fixing temperature exceeds the surface fixing temperature, the temperature control unit 503 discriminates whether a printing rate is equal to or smaller than a first threshold. The first threshold is, for example, 30%. If the printing rate is equal to or smaller than the first threshold (e.g., equal to or lower than 30%), the temperature control unit 503 controls the temperature of the fixing device 40 to a temperature equal to or lower than the surface fixing temperature. This is because, if the printing rate is equal to or smaller than the first threshold, image quality is not markedly deteriorated even if the fixing temperature is lowered.

A predetermined time is required to control the temperature of the fixing device 40 to reach the temperature equal to or lower than the surface fixing temperature. In one embodiment, a cooling fan 142 is operated in order to quickly lower the temperature of the fixing device 40. If the temperature of the fixing device 40 is equal to or lower than the surface fixing temperature, the operation of the cooling fan 142 is stopped according to control of the CPU 301.

The printing executing unit 504 causes the sheet St to stay on standby in a predetermined position until the temperature controlled by the temperature control unit 503 drops. The predetermined position is, for example, in the registration unit 52. If a predetermined standby time until the temperature drops elapses, the printing executing unit 504 controls the registration unit 52 and feeds the sheet St to the secondary transfer unit 38 at predetermined timing.

Subsequently, a case in which the printing rate is larger than the first threshold and equal to or smaller than a second threshold is explained. If the printing rate is larger than the first threshold and equal to or smaller than the second threshold, the concentration control unit 506 lowers an image concentration or density. A reduction amount of the image concentration should be enough for securing at least minimum image quality. The second threshold is, for example, 50%. If the printing rate is larger than the first threshold and equal to or smaller than the second threshold, the concentration control unit 506 forcibly lowers the image concentration. However, in one embodiment, the concentration control unit 506 generate a user confirmation screen 700 (see FIG. 7) to be displayed on the display 110 to obtain a permission of the user before lowering the image concentration.

Specifically, the receiving unit 507 acquires an instruction about whether to lower the image concentration from the user via the display 110. If the receiving unit 507 acquires an instruction to lower the image concentration, the concentration control unit 506 lowers the image concentration.

To determine the standby time, the image forming apparatus 100 stores a correspondence table indicating a temperature drop of the fixing device 40 corresponding to elapse of time to specify the standby time. The correspondence table may be prepared for each environmental temperature. In order to cope with the image forming apparatus 100 not including the air cooling fan 42, as the correspondence table, a table indicating a temperature drop of the fixing device 40 of the image forming apparatus 100 with the air cooling fan 42 and a table indicating a temperature drop of the fixing device 40 of the image forming apparatus 100 without the air cooling fan 42 may be prepared.

If the image concentration is lowered, the temperature control unit 503 controls the temperature of the fixing device 40 to a temperature equal to or lower than the surface fixing temperature. By lowering the image concentration in this way, even if the fixing temperature is lowered, it is possible to heat and fix the toner on the sheet St while maintaining the minimum image quality.

Subsequently, a case in which an instruction not to lower the image concentration is received is explained. If the receiving unit 507 acquires an instruction not to lower the image concentration, the stopping unit 508 stops the rear surface printing. Specifically, the stopping unit 508 causes the printing executing unit 504 to stop the execution of the rear surface printing. If the rear surface printing is stopped, the printing executing unit 504 performs printing using another sheet instead of the sheet St. The other sheet may be selected by the user or may be set in advance.

The stopping unit 508 also stops the rear surface printing if the printing rate is larger than the second threshold. This is because, since the printing rate is too high, even if the image concentration is lowered, the minimum image quality cannot be maintained.

Subsequently, control processing for the fixing temperature performed by the image forming apparatus 100 is explained with reference to FIG. 6.

Figure 6:
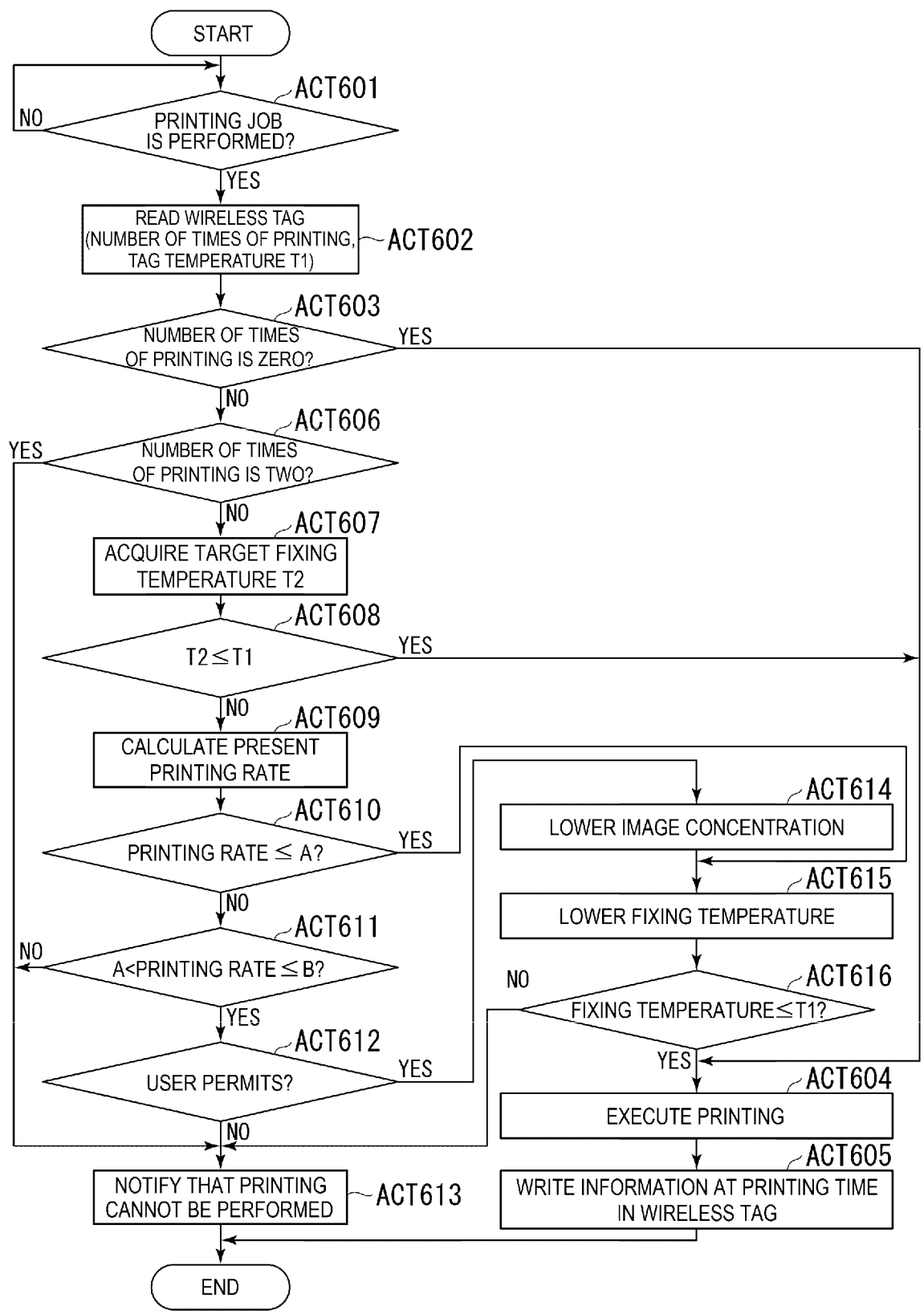
FIG. 6 is a flowchart of control processing for a fixing temperature performed by an image forming apparatus.

FIG. 6 is a flowchart of the control processing for the fixing temperature performed by the image forming apparatus 100. In FIG. 6, the image forming apparatus 100 determines whether a printing job is performed (ACT 601). The image forming apparatus 100 stays on standby until a printing job is performed (NO in ACT 601). If a printing job is performed (YES in ACT 601), the image forming apparatus 100 reads information written in the wireless tag Tg using the wireless tag communication device 60 (ACT 602). In the sheet St already printed, history information indicating the number of times of printing and a fixing temperature T1 at a printing time (hereinafter referred toas the surface fixing temperature T1) are included in the information.

Information for designating a type of the sheet St is included in the printing job. Accordingly, if the present printing is performed on the sheet St including a wireless tag, in ACT 602, the image forming apparatus 100 is capable of reading information written in the wireless tag Tg.

However, irrespective of a type of the sheet St, the image forming apparatus 100 may read the wireless tag Tg every time printing is performed. In such a case, the image forming apparatus 100 determines that the sheet St includes the wireless tag Tg if some information is read, and determine that the sheet St does not include the wireless tag Tg if no information is read. Consequently, even if a used sheet (a sheet St for rear surface printing) including a wireless tag Tg is mixed in a sheet cassette with unused sheets, the image forming apparatus 100 can detect the used sheet St and perform the rear surface printing corresponding to the sheet St in a manner distinct from the unused sheets with which it is mixed in the sheet cassette.

The image forming apparatus 100 refers to history information in the read information and determines whether the number of times of printing of the sheet St is zero (ACT 603). If the number of times of printing is zero (YES in ACT 603), that is, the sheet St is unused, the image forming apparatus 100 executes front surface printing (the first printing) (ACT 604).

The image forming apparatus 100 writes information at the printing time into the wireless tag Tg of the sheet St (ACT 605) and ends a series of processing. The information at the printing time includes the fixing temperature at the present printing time and the history information indicating the number of times of printing.

If the number of times of printing is not zero in ACT 603 (No in ACT 603), the image forming apparatus 100 determines whether the number of times of printing of the sheet St is two (ACT 606). If the number of times of printing is two (YES in ACT 606), that is, if the sheet St is the sheet St printed on both the surfaces, the image forming apparatus 100 proceeds to ACT 613 and notifies that printing cannot be performed.

If the number of times of printing is not two (NO in ACT 606), that is, if the number of times of printing is one, the image forming apparatus 100 acquires a target fixing temperature T2 in the present printing (ACT 607). The image forming apparatus 100 determines whether the target fixing temperature T2 is equal to or lower than the surface fixing temperature T1 (ACT 608). If the target fixing temperature T2 is equal to or lower than the surface fixing temperature T1 (YES in ACT 608), the image forming apparatus 100 proceeds to ACT 604 and executes the rear surface printing.

If the target fixing temperature T2 is not equal to or lower than the surface fixing temperature T1 (NO in ACT 608), the image forming apparatus 100 calculates a printing rate in the present printing (ACT 609). The image forming apparatus 100 determines whether a printing rate is equal to or smaller than the first threshold A (e.g., 30%) (ACT 610). If the printing rate is equal to or smaller than the first threshold A (YES in ACT 610), the image forming apparatus 100 proceeds to ACT 615 and lowers the fixing temperature only at the present printing time. Consequently, at the present printing time, printing is performed at the surface fixing temperature T1 or lower.

If the printing rate is not equal to or smaller than the first threshold A (NO in ACT 610), the image forming apparatus 100 determines whether the printing rate is larger than the first threshold A and equal to or smaller than the second threshold B (e.g., 50%) (ACT 611). If the printing rate is larger than the first threshold A and equal to or smaller than the second threshold B (YES in ACT 611), the image forming apparatus 100 displays the user confirmation screen (see FIG. 7) and determines whether a permission to lower the image concentration was received from the user (ACT 612).

If the permission to lower the image concentration is not received from the user (NO in ACT 612), the image forming apparatus 100 notifies that the rear surface printing for the sheet St including the wireless tag Tg cannot be performed (ACT 613) and ends a series of processing. In such a case, the image forming apparatus 100 can perform printing using another sheet.

If the permission to lower the image concentration is received from the user (YES in ACT 612), the image forming apparatus 100 lowers the image concentration to the extent enough for securing the minimum image quality (ACT 614) and lowers the fixing temperature (ACT 615). Subsequently, the image forming apparatus 100 determines whether the fixing temperature of the fixing device 40 is equal to or lower than the surface fixing temperature T1 (ACT 616).

If the fixing temperature of the fixing device 40 is not equal to or lower than the surface fixing temperature T1 (NO in ACT 616) (for example, if a failure occurs in the fixing device 40 or if the fixing temperature does not drop because the environmental temperature is extremely low), the image forming apparatus 100 proceeds to ACT 613 and notifies that the rear surface printing for the sheet St including the wireless tag Tg cannot be performed. If the fixing temperature of the fixing device 40 is equal to or lower than the surface fixing temperature T1 (YES in ACT 616), the image forming apparatus 100 proceeds to ACT 604 and executes the rear surface printing.

Subsequently, a screen example displayed on the display 110 of the image forming apparatus 100 is explained with reference to FIG. 7.

Figure 7:
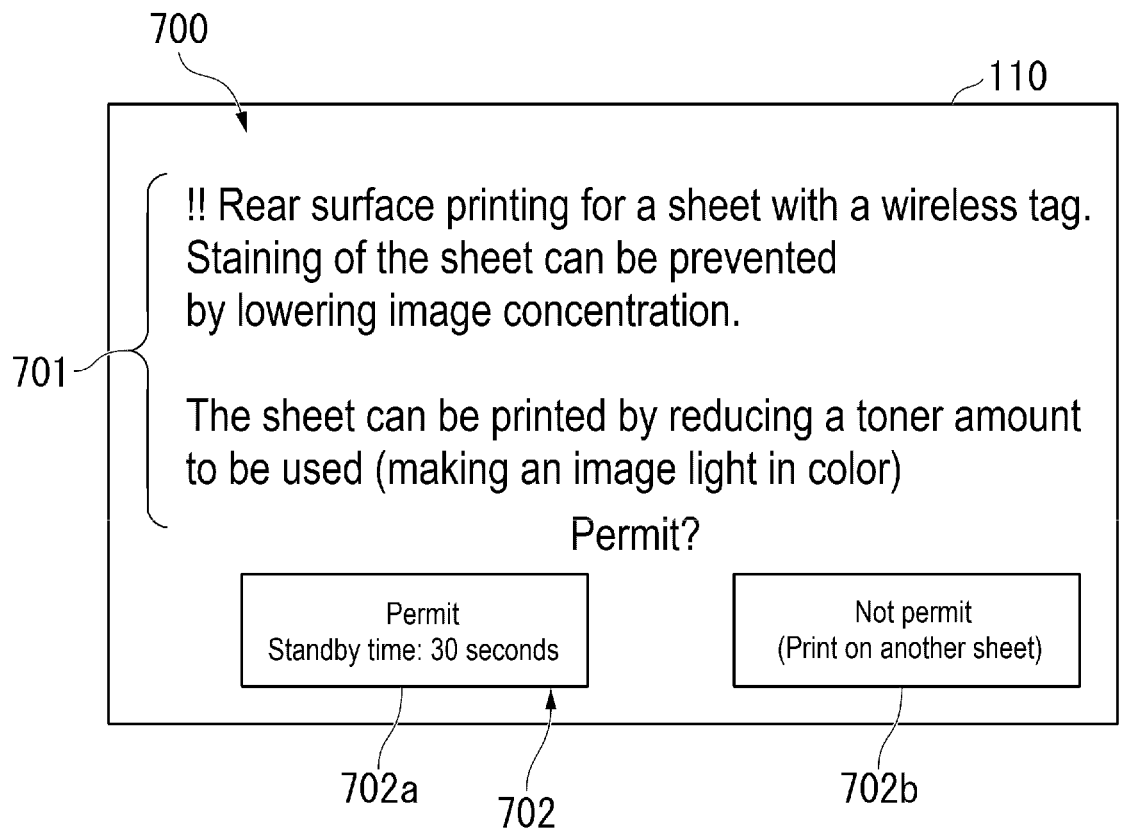
FIG. 7 depicts a user confirmation screen displayed when an image concentration is lowered.

FIG. 7 depicts an example of the user confirmation screen 700 displayed on the display 110 when the image concentration is lowered. The user confirmation screen 700 includes a notification image 701 and selection buttons 702.

The notification image 701 indicates that staining of the sheet St can be prevented by lowering the image concentration and printing can be performed on the sheet St by reducing a toner amount. The selection buttons 702 include a permission button 702a and a non-permission button 702b. The permission button 702a is a button for receiving an instruction to reduce the toner amount and perform printing.

The permission button 702a includes display of a standby time. The standby time is required until the fixing temperature becomes equal to or lower than the surface fixing temperature T1. Consequently, the user can grasp a waiting time in printing. An indication of occurrence of a waiting time such as "Please wait a while until printing starts" may be displayed instead of the display of the standby time.

The non-permission button 702b is a button for receiving an instruction to not reduce a toner amount but perform printing. If the non-permission button 702b is pressed, printing is performed on another sheet. If the printing is performed on the other sheet, the image forming apparatus 100 may receive selection of a type of the other sheet from the user or, if a substitute sheet is correlated with the sheet St including the wireless tag Tg in advance, may automatically select the substitute sheet.

As explained above, the image forming apparatus 100 according to the above-described embodiments writes the surface fixing temperature T1 in the front surface printing into the wireless tag Tg and controls the temperature of the fixing device 40 in the rear surface printing for the sheet St based on the surface fixing temperature T1 read from the wireless tag Tg. Consequently, since it is possible to prevent the fixing temperature at the time of the rear surface printing for the sheet St from becoming higher than the surface fixing temperature T1, it is possible to prevent the toner on the surface from melting at the rear surface printing time. Therefore, it is possible to prevent staining of the sheet and smearing of the fixing device 40 at the rear surface printing time and suppress breakage of the fixing device 40. Accordingly, with the image forming apparatus 100 according to the above-described embodiments, it is possible to appropriately perform the rear surface printing.

If the target fixing temperature T2 set in performing the rear surface printing is the surface fixing temperature T1, the image forming apparatus 100 according to the above-described embodiments controls the temperature of the fixing device 40 to the target fixing temperature T2. Consequently, if it is unlikely that the toner on the surface melts at the rear surface printing time, the image forming apparatus 100 performs printing while keeping the target fixing temperature. Therefore, it is possible to perform the rear surface printing without deteriorating image quality.

If the target fixing temperature T2 exceeds the surface fixing temperature T1 and the printing rate in the rear surface printing is equal to or smaller than the first threshold A (e.g., 30%), the image forming apparatus 100 according to above-described embodiments controls the temperature of the fixing device 40 to be equal to or lower than the surface fixing temperature T1. Consequently, if the image quality is not markedly deteriorated even if the fixing temperature is lowered, it is possible to lower the temperature of the fixing device 40 and perform printing.

If the printing rate is larger than the first threshold A (e.g., 30%) and is equal to or smaller than the second threshold B (e.g., 50%), the image forming apparatus 100 according to the above-described embodiments lowers the image concentration and controls the temperature of the fixing device 40 based on the surface fixing temperature T1. Consequently, in the rear surface printing, it is possible to maintain the minimum image quality and perform the rear surface printing.

If receiving an instruction to lower the image concentration from the user, the image forming apparatus 100 according to the above-described embodiments lowers the image concentration. Consequently, it is possible to prevent the image concentration from being lowered against the intention of the user. That is, it is possible to prevent the image quality from being deteriorated against the intention of the user.

If receiving an instruction not to lower the image concentration, the image forming apparatus 100 according to the above-described embodiments stops the rear surface printing. Consequently, it is possible not to perform printing in which the image quality is deteriorated. It is possible to perform printing on another sheet without lowering the image quality.

If the printing rate is larger than the second threshold B (e.g., 50%), the image forming apparatus 100 according to the above-described embodiments stops the rear surface printing. Consequently, it is possible not to perform printing in which the minimum image quality cannot be obtained even if the image concentration is lowered. It is possible to perform printing on another sheet without lowering image quality.

The image forming apparatus 100 according to the above-described embodiments reads the history information indicating the number of times the sheet St is printed and, if the number of times indicated by the history information is one, controls the temperature of the fixing device 40 based on the surface fixing temperature T1. Consequently, it is possible to perform the control of the fixing temperature according to the above-described embodiments only on the sheet St printed on the front surface. That is, it is possible not to perform the control of the fixing temperature on a sheet printed on both the surfaces.

A part of the functions of the image forming apparatus 100 according to the embodiments explained above may be performed by a computer. In such a case, a program for performing the functions is recorded in a non-transitory computer-readable recording medium. The functions may be performed by causing a computer system to read and execute the program recorded in the recording medium.

The "computer system" referred to herein includes an operating system and hardware such as peripheral equipment. The "computer-readable recording medium" means a portable medium, a storage device, or the like. The portable medium is a flexible disk, a magneto-optical disk, a ROM, a CD-ROM, or the like. The storage device is a hard disk or the like incorporated in the computer system. The "computer-readable recording medium" may be a volatile memory in the computer system functioning as a server or a client. The volatile memory is a memory that retains a program for a particular time. The program may perform a part of the functions explained above. Further, the program may perform the functions explained above in combination with a program already recorded in the computer system.

While certain embodiments have been described, these embodiments have been presented by way of example only, and are not intended to limit the scope of the inventions.

Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus, comprising:
   a wireless tag communication device configured to communicate with a wireless tag;
   a fixing device configured to fix a toner image on a sheet; and
   a processor configured to:
      upon receipt of a print job for forming a toner image on a sheet having a wireless tag attached thereto, control the communication device to read from the wireless tag attached to the sheet a first fixing temperature that has previously been used,
      determine from the print job a ratio of a total area of toner of the toner image to be formed on the sheet to an entire area of the sheet,
      determine a second fixing temperature to be used by the fixing device based on the determined ratio, the second fixing temperature being lower than or equal to the first fixing temperature, and
      execute the print job by controlling the fixing device to fix the toner image on the sheet at the second fixing temperature.

2. The image forming apparatus according to claim 1, wherein
   the processor is further configured to, before determining the second fixing temperature, determine that printing has already been performed on one side of the sheet.

3. The image forming apparatus according to claim 2, wherein the processor is further configured to control the communication device to read history information from the wireless tag, the history information indicating whether printing has already been performed on the sheet.

4. The image forming apparatus according to claim 1, wherein the processor is further configured to
   determine whether the ratio is greater than a first threshold and less than or equal to a second threshold that is greater than the first threshold, and
   upon determining that the ratio is greater than the first threshold and less than or equal to the second threshold, execute the print job after lowering an image concentration of the image to be printed on the sheet.

5. The image forming apparatus according to claim 4, further comprising:
   a display, wherein
   the processor is further configured to control the display to display a screen through which an instruction of whether to lower the image concentration can be input.

6. The image forming apparatus according to claim 5, wherein the processor is further configured to execute the print job on another sheet on which printing has not been performed when the instruction to not lower the image concentration is input through the screen.

7. The image forming apparatus according to claim 5, wherein the screen shows a first selectable button for inputting the instruction.

8. The image forming apparatus according to claim 7, wherein the screen shows a second selectable button for executing the print job on another sheet on which printing has not been performed without lowering the image concentration.

9. An image forming method performed by an image forming apparatus that includes a fixing device, the method comprising:
   upon receipt of a print job for forming a toner image on a sheet having a wireless tag attached thereto, reading from the wireless tag a first fixing temperature that has previously been used;
   determining from the print job a ratio of a total area of toner of the toner image to be formed on the sheet to an entire area of the sheet;
   determining a second fixing temperature to be used by the fixing device based on the determined ratio, the second fixing temperature being lower than or equal to the first fixing temperature; and
   executing the print job by controlling the fixing device to fix the toner image on the sheet at the second fixing temperature.

10. The image forming method according to claim 9, further comprising:
    before determining the second fixing temperature, determining that printing has already been performed on one side of the sheet.

11. The image forming method according to claim 10, further comprising:
    reading history information from the wireless tag, the history information indicating whether printing has already been performed on the sheet.

12. The image forming method according to claim 9, further comprising:
    determining whether the ratio is greater than a first threshold and less than or equal to a second threshold that is greater than the first threshold; and
    after determining that the ratio is greater than the first threshold and less than or equal to the second threshold, lowering an image concentration of the image to be printed on the sheet before executing the print job.

13. The image forming method according to claim 12, further comprising:
    displaying a screen through which an instruction of whether to lower the image concentration can be input.

14. A non-transitory computer readable medium storing a program causing an image forming apparatus that includes a fixing device, to execute a method comprising:
    upon receipt of a print job for forming a toner image on a sheet having a wireless tag attached thereto, reading from the wireless tag a fixing temperature that has previously been used;
    determining from the print job a ratio of a total area of toner of the toner image to be formed on the sheet to an entire area of the sheet;
    determining a second fixing temperature to be used by the fixing device based on the determined ratio, the second fixing temperature being lower than or equal to the first fixing temperature; and
    executing the print job by controlling the fixing device to fix the toner image on the sheet at the second fixing temperature.

* * * * *